(No Model.)

D. P. KISNER.
COMBINED FORK AND SPOON.

No. 398,264. Patented Feb. 19, 1889.

WITNESSES.
INVENTOR.
David P. Kisner
By R. S. & A. P. Lacey
Attorneys

UNITED STATES PATENT OFFICE.

DAVID P. KISNER, OF MANLY, IOWA.

COMBINED FORK AND SPOON.

SPECIFICATION forming part of Letters Patent No. 398,264, dated February 19, 1889.

Application filed December 3, 1888. Serial No. 292,499. (No model.)

*To all whom it may concern:*

Be it known that I, DAVID P. KISNER, a citizen of the United States, residing at Manly, in the county of Worth and State of Iowa, have invented certain new and useful Improvements in a Combined Fork and Spoon; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a combined fork and spoon, or the spoon can be combined with any article of table-cutlery, preferably with a fork.

The object of the invention is to provide an article for general use, and particularly for travelers and sportsmen, that can be stored in a small space, and which will be light and convenient to handle, and efficient.

The improvement consists in combining with the handle of an article of table-cutlery another article of the same nature, but designed for a different purpose, whereby the same handle can be used for more than one article, and a fork or spoon can be had by reversing the article end for end.

The improvement consists more particularly in the means whereby the one article can be readily detached from and applied to the main article, the same consisting in having the end of the handle of the main article, which, as shown, is a fork, turned down and apertured to receive the shank of the second article, or spoon, and having a portion swaged from or otherwise formed on the spoon-handle at a distance from the said bent end to receive the end of the shank and steady the position of the same.

The improvement further consists in the novel features which will be hereinafter more fully described and claimed, and shown in the accompanying drawings, in which—

Figure 1:
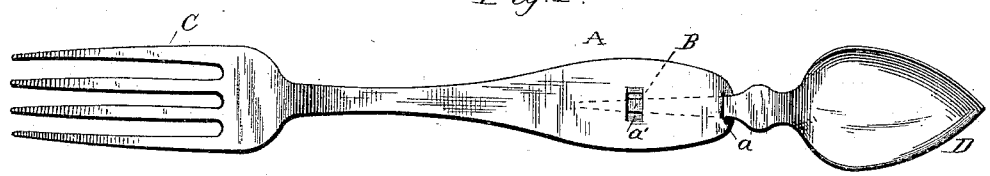
Figure 2:
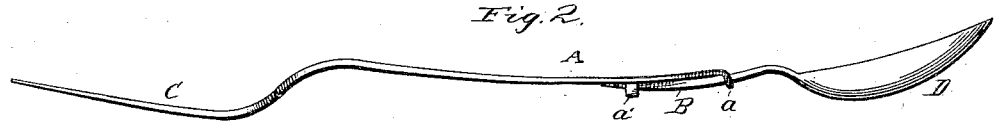
Figure 3:
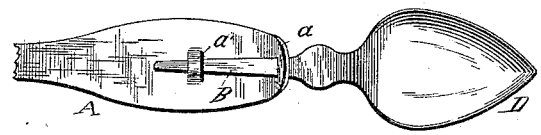
Figure 4:
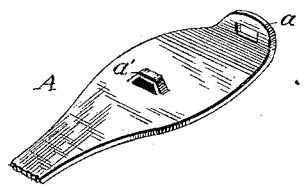

Figure 1 is a top view of my invention; Fig. 2, an edge view of the same; Fig. 3, a view of a handle, the reverse of that shown in Fig. 1, showing the application of my invention; and Fig. 4, a detail view of the handle.

The handle A is provided at its outer end with the keepers $a$ and $a'$, which are designed to receive the shank B, and may be provided at its inner end with any suitable device for table use, as the fork C. The shank B has an article of table-cutlery on its outer end, which, as shown, is the spoon D. The keeper $a$ is formed by bending the end of the handle at about right angles, and the keeper $a'$ by swaging a portion from the said handle.

The shank B is thin and wide and tapers in width and thickness from its inner end, so that when it is inserted in the keepers it will wedge its way therein and be held firmly in place.

Having thus described my invention, what I claim, and desire to secure by Letters Patent, is—

1. The combination, with the handle A, having an article of table-cutlery, as C, formed on one end, and having the keepers $a$ and $a'$ at its other end, of the article D, having a shank, B, which is adapted to be inserted in the keepers $a$ and $a'$, whereby the handle A is common to both of the said articles C and D, substantially as shown and described.

2. In an article of table-cutlery, the combination, with the handle having its end bent down to form the keeper $a$, and having a portion swaged therefrom to form the keeper $a'$, of the shank B, adapted to be held in the said keepers, substantially as and for the purpose described.

In testimony whereof I affix my signature in presence of two witnesses.

DAVID P. KISNER.

Witnesses:
F. A. NILES,
P. A. HARTWELL.